United States Patent [19]

Perrine et al.

[11] Patent Number: 4,610,470
[45] Date of Patent: Sep. 9, 1986

[54] CONDUIT COUPLING

[75] Inventors: Neill D. Perrine; Paul J. E. Fournier, both of Jackson, Mich.

[73] Assignee: Aeroquip Corporation, Jackson, Mich.

[21] Appl. No.: 638,067

[22] Filed: Aug. 6, 1984

[51] Int. Cl.[4] .............................................. F16L 21/04
[52] U.S. Cl. .................................... 285/321; 285/343; 285/348; 285/369; 285/383
[58] Field of Search ....... 285/383, 319, 343, 321 (U.S. only), 285/348, 321, 369

[56] References Cited

U.S. PATENT DOCUMENTS

| 2,040,155 | 5/1936 | Shoemaker | 285/383 X |
| 2,105,747 | 1/1938 | Martin et al. | 285/383 X |
| 3,074,747 | 1/1963 | Boughton | 285/348 X |
| 3,179,445 | 4/1965 | Moretti | 285/383 X |
| 3,669,472 | 6/1972 | Nadsady | 285/348 X |
| 3,711,125 | 1/1973 | Dehar | 285/319 X |
| 3,826,523 | 7/1974 | Eschbaugh | 285/319 X |
| 3,997,199 | 12/1976 | Arnold | 285/348 X |
| 4,135,745 | 1/1979 | Dehar | 285/319 |
| 4,346,918 | 8/1982 | Lycan | 285/383 X |

Primary Examiner—Thomas F. Callaghan
Attorney, Agent, or Firm—Beaman & Beaman

[57] ABSTRACT

A fitting for rigid conduit including an annular body receiving the conduit and including a seal assembly utilizing an elastomeric seal axially compressed and radially expanded to engage the conduit by a compression ring. A ring retainer maintains the seal assembly in a preliminary position during shipping and assembly of the coupling with the conduit, and the ring retainer includes a second position retaining the seal in a sealed expanded condition. The fitting also includes a conduit positioning abutment capable of accommodating conduit displacement during sealing.

4 Claims, 10 Drawing Figures

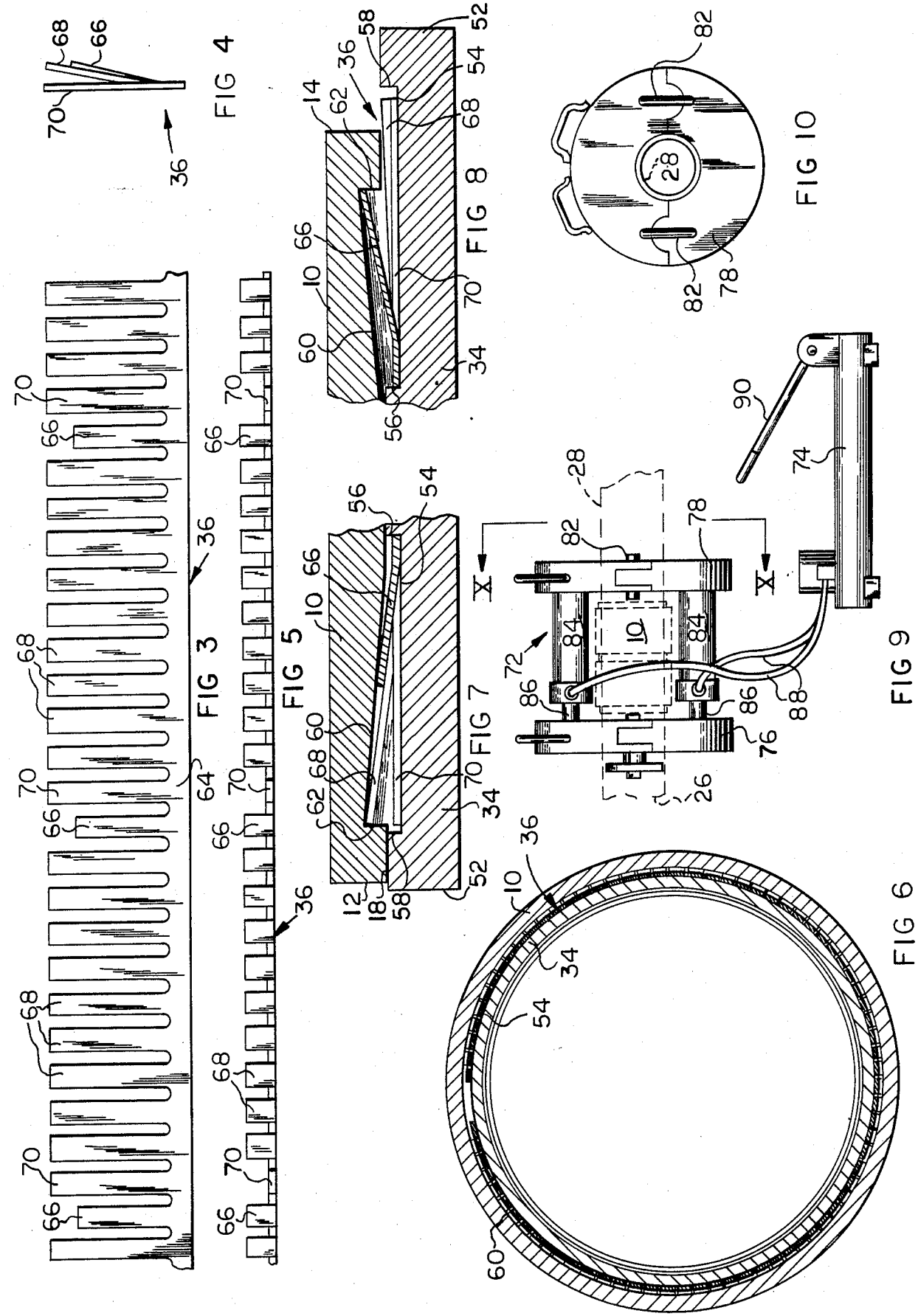

CONDUIT COUPLING

BACKGROUND OF THE INVENTION

Fittings and couplings for rigid conduit utilize a variety of mechanical relationships to sealingly interrelate the fitting and conduit. Bolts, flanges, threads, gaskets, ferrules, elastomeric seals and other components and relationships are commonly employed. Usually, fittings and couplings for conduit are relatively bulky in configuration and are of a diameter substantially greater than that of the conduit with which they are associated. Relatively complex and time consuming operations are usually required to assemble the fitting and conduit.

It is an object of the invention to provide a fitting for rigid threadless conduit utilizing a compressed elastomeric seal wherein a seal assembly is preliminarily associated and positioned within the fitting to facilitate and simplify fitting-conduit assembly.

Another object of the invention is to provide a fitting for rigid conduit utilizing an elastomeric seal wherein the seal is uniformly compressed to insure a fluid-tight relationship, and the fitting is economical to manufacture, concise in configuration, and readily mounted upon conduit with a minimum of skill.

An additional object of the invention is to provide a fitting for rigid threadless conduit wherein the fitting is tamper-proof and once assembled to a conduit, cannot be readily removed.

Another object of the invention is to provide a fitting for rigid conduit utilizing conduit positioning means within the fitting which accommodates limited conduit movement during the final stages of sealing.

Yet another object of the invention is to provide a coupling for connecting rigid conduit in end-to-end relationship employing a removable abutment for positioning the coupling to the conduit, but permitting the coupling to be installed on in-line conduit wherein axial conduit displacement is not permitted.

Yet an additional object of the invention is to provide a coupling for rigid conduit utilizing a conduit positioning abutment which may be selectively installed or removed exteriorly of the coupling to facilitate assembly of the coupling and conduit.

In the practice of the invention, the fitting includes a body defining a flow path intersecting a body end. A seal assembly is located within the flow path and includes an elastomer seal which is axially compressed by a compression ring. The conduit associated with the fitting is located within the seal assembly whereby compression of the elastomer seal deforms the elastomeric material radially inward into engagement with the conduit to produce a fluid-tight relationship.

The axial position of the compression ring is controlled by a spring steel retainer in the form of a band received within an annular groove within the compression ring. The band includes a plurality of cantilevered teeth having free ends, and several of the teeth substantially equally spaced about the circumference of the compression ring are deformed from the circular configuration of the band for selective engagement with a radially disposed abutment surface defined in the body adjacent the flow passage. The band is so oriented upon the compression ring, and certain teeth of the band are of such dimension, that these teeth cooperate with the body recess preventing withdrawal of the seal assembly from the body during a pre-assembly state of the seal assembly which locates the seal assembly components for reception of a conduit therein, but the elastomeric seal is not under compression.

When the conduit has been properly located within the seal assembly and body, the compression ring is axially displaced further into the body, compressing the elastomeric seal, and the retainer includes teeth of such dimension as to align with and engage the body recess shoulder to prevent axial withdrawal of the compression ring from the body once a full state of elastomeric seal compression has been achieved.

The compression ring retainer is simply formed of spring steel stock material and stamped to form a comb-like configuration wherein selected teeth may be deformed from the general plane of the band. The different lengths of the teeth permit the teeth to serve the functions of retaining the band within the compression ring groove, retaining the seal assembly within the body prior to compression of the seal and retaining the compression ring within the body during compression of the elastomeric seal.

The seal assembly may include a split ring internally serrated collar having a conical surface cooperating with an annular piston engaging the elastomeric seal having an oblique surface wherein the axial forces imposed upon the seal assembly by the compression ring cause the piston to inwardly deflect the split collar embedding the collar serrations into the conduit and thereby increasing the "grip" upon the conduit.

The compression ring is located within the confines of the body, and the construction of a fitting in accord with the invention produces a concise arrangement of components having a diameter only slightly greater than the diameter of the conduit with which the fitting is associated. Axial displacement of the compression ring may be produced by various means, and in the description below, and drawings, one type of hydraulically operated actuator is described.

The inventive concepts may be practiced within a coupling employed to align and maintain conduits in end-to-end relationship. In such a coupling, the body includes a flow passage extending therethrough and identical seal assemblies are located in the flow passage adjacent each coupling body end. Preferably, the central region of the body and flow path is internally provided with an abutment extending into the flow passage for engagement by the conduit end to limit insertion of the conduit into the body and properly orient the body and conduit prior to producing the sealed relationship.

As a coupling employing the invention may advantageously be employed in an existing conduit system to repair leaks, or permit the installation of a tee or other type fitting, it may be desirable to initially insert the coupling completely upon the conduit after laterally displacing aligned in-line conduits incapable of axial movement. In such instance the abutment would prevent such an excessive insertion of the conduit in the coupling, and, in accord with the invention, the abutment may be selectively removed to permit such installation.

When utilizing a seal assembly having a split collar having serrations, the compression of the split collar may impose slight axial movement upon the conduit during the final stages of seal assembly compression. Normally, the abutment within the coupling would resist such axial displacement of the conduit, but in accord with the practice of the invention the use of a wave spring as an abutment permits limited axial displacement during the final stages of sealing, and yet accurately axially aligns the coupling and conduit during initial assembly.

BRIEF DESCRIPTION OF THE DRAWINGS

The aforementioned objects and advantages of the invention will be appreciated from the following description and accompanying drawings wherein:

FIG. 3 is a plan view of the ring retainer band prior to being formed into a circular configuration, FIG. 4 is an end elevational view of FIG. 3 as taken from the right, FIG. 5 is an edge-wise elevational view as taken from the lower edge of FIG. 3, FIG. 6 is an elevational sectional view as taken along Section VI—VI of FIG. 2, FIG. 7 is an enlarged, detail, sectional view illustrating the relationship of the coupling body and compression ring when the compression ring is fully inserted into the body, FIG. 8 is an enlarged, detailed, elevational, sectional view of the body and compression ring illustrating the preliminary positioning of the coupling body, FIG. 9 is an elevational view of apparatus used to axially displace the compression rings within the coupling, and FIG. 10 is an end sectional view of the apparatus of FIG. 9 as taken along Section X—X thereof.

DESCRIPTION OF THE PREFERRED EMBODIMENT

Figure 1:
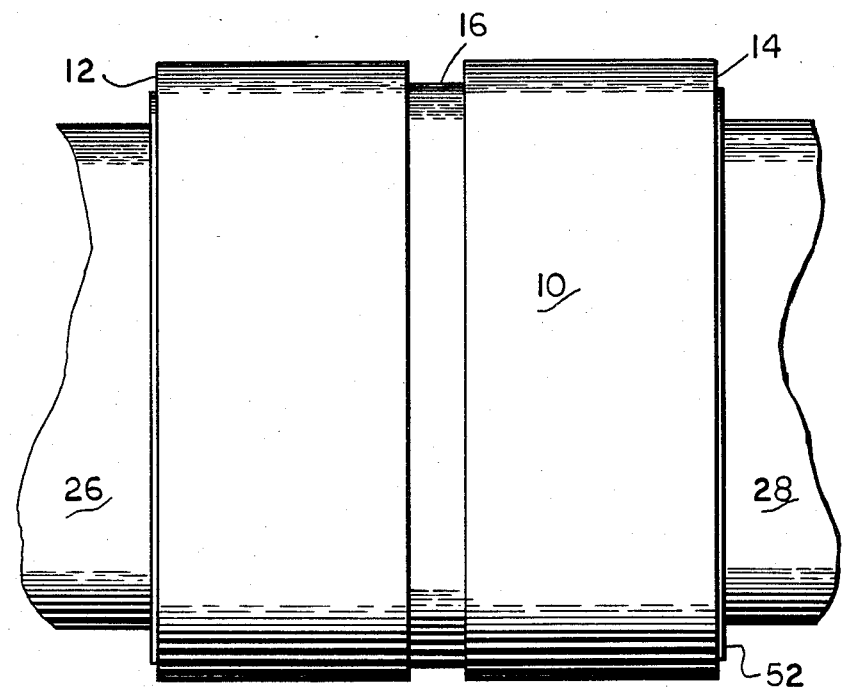
FIG. 1 is an elevational view of a coupling in accord with the invention, the components being illustrated in the sealed relationship.

Several of the inventive concepts can be utilized in various types of fittings with rigid conduit. For instance, the compression ring retainer may be used with tees, elbows, couplings and the like in that all such fittings will utilize a seal assembly of the disclosed type. However, the inventive aspects of the abutment are primarily advantageous when used with a coupling, and for that reason, the fitting illustrated is of the coupling type, but it is to be appreciated that the inventive concepts are not limited to this particular type of fitting.

In the drawings, the coupling body is illustrated at 10 and comprises a cylindrical body having ends 12 and 14, a central region 16, and cylindrical surfaces 18 internally forming seats for the seal assemblies, and in a general manner, defining a flow path for fluid through the coupling. In the illustrated embodiment the central region of the coupling is recessed wherein annular transverse abutment shoulders 20 are defined within the flow passage and an annular groove 22 is internally formed within the central region.

The coupling is used to interconnect two rigid conduits 26 and 28 in end-to-end relationship. The conduits would normally be of the threadless steel type, but could be formed of a synthetic material within the scope of the invention.

Identical seal assemblies generally indicated at 30 are located adjacent each coupling body end engaging surfaces 18. Basically, a seal assembly includes an elastomeric seal ring 32 formed of polyurethane, a rigid compression ring 34 and the compression ring retainer 36. However, it is also of advantage to use a split collar 38 and collar actuating piston 40, and these elements are also illustrated as included within the seal assembly.

The split collar includes internal annular serrations 42 adapted to embed into the outer diameter of the conduits, and the serrations are obliquely disposed toward the central region of the body. The collar 38 includes a conical cam surface 44 which cooperates with the conical surface 46 formed upon the annular piston 40 wherein axial displacement of the piston toward the body central region radially compresses the split collar 38 embedding the serrations 42 into the conduit circumscribed by the collar.

The polyurethane seal 32 has an external diameter normally equal to the diameter of the body surface 18, and the internal cylindrical normal diameter of the seal substantially corresponds to the outer diameter of the associated conduit whereby the conduit may be readily inserted into the seal. The seal includes an outer end oblique surface 48 engaging the oblique surface 50 defined upon the seal ring 34 wherein compression of the seal by the ring encourages inward radial deformation of the seal to compress and inwardly deform the conduit as shown in dotted lines in the left half of FIG. 2.

The compression ring 34 is of a generally cylindrical configuration having an internal diameter slightly greater than the outer diameter of the conduits and an outer end 52 lies in a plane perpendicular to the axis of the coupling and seal assembly. The cylindrical outer surface of the compression ring is slidably received within the body surface 18, and a cylindrical recess 54 is defined therein axially defined by an inner radial shoulder 56 and an outer radial shoulder 58.

The body 10 is internally provided adjacent each end 12 and 14 with an annular countersunk conical recess 60 terminating in a radial abutment shoulder 62, and the abutment shoulder cooperates with the compression ring retainer 36, as later described.

The position of the compression ring 34 within the coupling body is determined by the ring retainer 36 located within the recess 54. The retainer is formed of a sheet metal spring steel stamping of a configuration best appreciated from FIGS. 3-5. The retainer is in the form of an elongated band of a comb-like configuration including a continuous base strip 64 from which depend a plurality of cantilevered teeth. Three types of teeth are defined upon the retainer, the preliminary pre-compression position teeth 66, the final compression ring positioning teeth 68, and the retainer positioning teeth 70. The three sets of teeth are evenly circumferentially located about the ring 34 when received within the ring recess 54. Teeth 68 are of the same length as the teeth 70 but are deflected from the plane of the teeth 70 as apparent from FIG. 4. The teeth 66 are "shorter" than teeth 68 and 70 and are also deflected from the plane of teeth 70. As the retainer 36 is formed of spring steel, and preferably heat treated, the teeth 66 and 68 will maintain their "deformed" position with respect to the plane of teeth 70. The width of the teeth and the characteristics of the steel thereof is such that substantial compressive force applied to the free end of the teeth in the direction of the teeth is resisted, while it is possible to readily "bend" the teeth toward the plane of teeth 70 upon applying a lateral force upon the teeth 66 and 68.

The retainer 36 is assembled to the associated compression ring 34 by placing the retainer band within the recess 54 such that the strip 64 is disposed adjacent the recess shoulder 56, and the free end of the teeth is adjacent the shoulder 58. Upon insertion of the compression ring 34 into a body end the engagement of the sides of the teeth 66 and 68 with the surface 18 at the intersection of the body end will impose an inward biasing force on the retainer maintaining the retainer within the recess 54.

Figure 2:
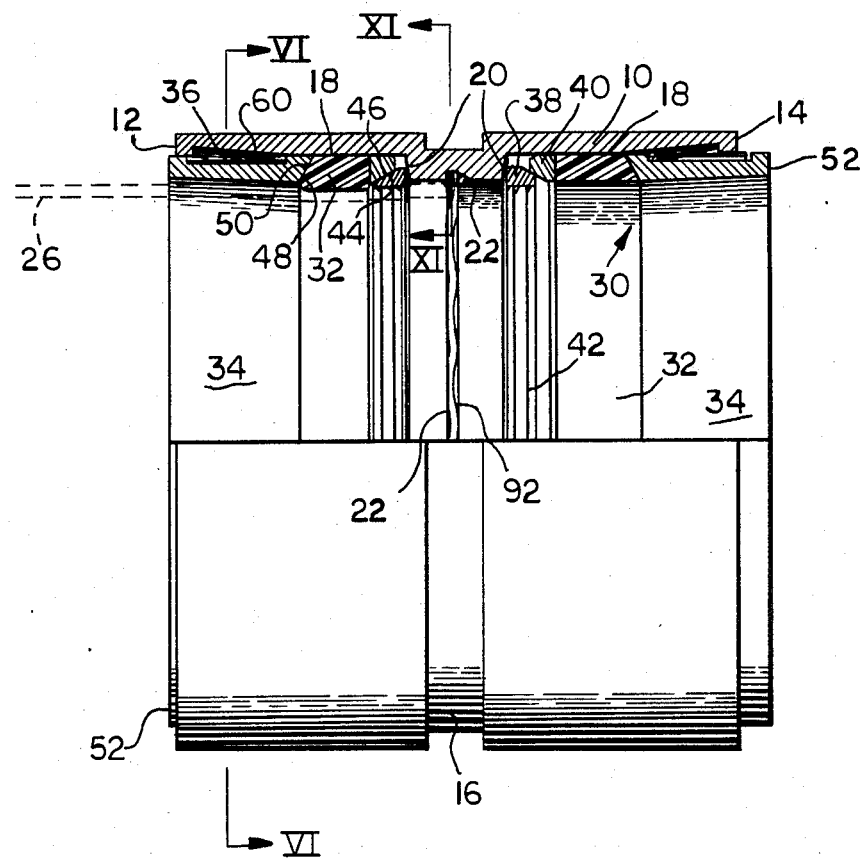
FIG. 2 is an elevational view, partially sectioned, illustrating the relationship of the components of the coupling in the sealed relationship at the left half and in the pre-compression relationship at the right half.

As the compression ring 34 is axially inserted into the body the teeth 70 maintain the retainer in recess 54 and alignment of the free end of the teeth 66 with the abutment shoulder 62 will permit the teeth 66 to deflect outwardly to the position of FIG. 8, and the right half of FIG. 2, which locks the compression ring within the coupling preventing the ring and seal assembly 30 from being withdrawn therefrom. At this position of the compression ring 34, the ring will be engaging the surface 48 of the seal 32, the piston 40 will be engaging the seal 32 and the surfaces 44 and 46 of the piston and collar 38 will be initially engaging as shown at the right of FIG. 2. Simultaneously, the collar 38 will be engaging the body shoulder 20. Thus, the components of the seal assembly will be in engagement with each other, but no compression or radial deformation of the seal 32 has taken place.

Compression of the elastomer seal 32 occurs when the seal ring 34 is inserted further into the body and the left half of FIG. 2 and FIG. 7 illustrate this condition. Upon insertion of the ring into the body 10 sufficiently such that the free end of the teeth 68 align with the shoulder 62, the teeth 68 will "spring" to the position shown in FIG. 2, at the left, and FIG. 7, preventing withdrawal of the ring from the coupling flow passage. This axial position of the ring 34 compresses the elastomer seal 32 into a tight circumferential relationship to the conduit 26, as shown in FIG. 2, and the forces are such that the conduit will be deformed inwardly increasing the mechanical frictional connection between coupling and conduit.

The axial forces required to displace the compression rings 34 of the coupling from the position of FIG. 8 to the position of FIG. 7 is substantial, especially with larger sizes of conduit, and this axial force may be produced by a variety of devices such as the apparatus shown in FIGS. 9 and 10. In these figures, a press 72 is illustrated which is mounted upon the conduits, and is powered by a hand operated hydraulic pump 74.

The press 72 includes two split collars 76 and 78 which surround the conduits 26 and 28. The collar's halves may be locked together by pins 82. Each collar is provided with a semi-circular opening of a diameter equal to the outer diameter of the associated conduit whereby the conduits are closely received within the collar openings, but a sliding relationship of the collar to the conduits is possible.

The collar 78 supports a pair of hydraulic cylinders 84 attached thereto, while the pistons 86 of the cylinders are attached to the collar 76. Flexible hose 88 connects the hydraulic cylinders 84 to the pump 74 which is operated by handle 90, and upon the collars being mounted upon the conduits wherein the coupling 10 is located intermediate the collars, pressurization of the cylinders 84 draws the collars toward each other in an axial direction.

As the collars 76 and 78 move toward each other, the ends 52 of the rings 34 are engaged thereby, and force toward each other into the coupling body from the position of FIG. 8 to the position of FIG. 7. Once the rings are fully in position and the retainer teeth 68 are as shown in FIG. 7, the pressure within the cylinders is relieved, the collars disassembled, and the press apparatus removed from the conduits.

When inserting the conduits 26 and 28 within the coupling it is desirable to be assured that the conduits are fully located within the coupling, but it is also important that the coupling be "centered" with respect to the associated conduits. To this end, a conduit abutment or stop is located within the body groove 22 limiting the depth which the conduit may be inserted into the coupling body. The abutment or stop located within the groove 22 is, preferably, an annular wave spring 92 as illustrated in FIG. 2, formed of spring steel stock of lesser axial dimension than the axial width of the groove. This construction is desirable in that the wave spring stop will accommodate slight axial movement of the conduits during the final sealing stages of the seal assembly. Due to the presence of the serrations 42, and the inclined angle of the serrations, as the serrations embed into the conduits, an axial force is applied to the conduits tending to push the conduits toward the central region of the coupling body. This slight axial force imposed upon the conduit causes the wave spring 92 to be compressed and permits maximum embedding of the collar serrations into the conduit to achieve a firm metal-to-metal relationship between the collar and conduit and prevents the system from "locking up" as would occur if no axial displacement of the conduits was possible during embedding of the serrations.

In some applications of couplings in accord with the invention, it is desirable to install the coupling on conduit which is already "in-line" within a fluid system. Such an occurrence may take place if the coupling is used to repair a leak within a conduit. However, it is often impossible to axially displace installed conduit in an existing system although lateral displacement within limits, may be achieved.

In such instance, the coupling of the invention can be installed upon in-line conduit if the conduit is severed and one section laterally displaced sufficiently to insert the entire length of the coupling upon a conduit, realign the conduits, and then axially displace the coupling on the conduit so as to "bridge" the aligned conduits and then seal the coupling to the conduits.

The aforementioned procedure cannot be accomplished if the abutment or stop spring 92 is in position, and in such instance the wave spring 92 is removed from the groove 22 and upon removal of the wave spring, the coupling may be fully inserted upon a conduit for its entire axial length.

It is appreciated that various modifications to the inventive concepts may be apparent to those skilled in the art without departing from the spirit and scope of the invention.

We claim:

1. A fitting for rigid conduit having cylindrical ends comprising, in combination, a body having a flow passage having an axis and an internal cylindrical surface intersecting an open end, seal structure within said flow passage adjacent said open end adapted to circumscribe a conduit inserted into said body open end, said seal structure including an abutment defined within said body axially spaced from said open end, an annular elastomeric seal operatively restrained against axial displacement by said abutment, an annular compression ring axially displaceable within said flow passage to compress said seal to radially expand said seal inwardly to seal and frictionally grip a conduit therein, ring retaining means interposed between said ring and body preventing axial displacement of said ring away from said seal upon a predetermined axial position of said ring being attained, said ring retaining means including first and second ring retaining elements, said first elements retaining said ring and seal assembly at a first axial position within said flow passage prior to compression and expansion of said seal, said second elements maintaining positioning of said compression ring at a second axial position during compression and expansion of said seal, abutment means defined on said body, an annular circumferential groove defined in the circumference of said compression ring axially defined by radial shoulders, an annular recess defined within said body cylindrical surface adjacent said open end having a radial shoulder facing said abutment and defining said abutment means, said ring retaining means comprising an annular band received within said groove having an axial width substantially equal to the groove axial dimension, a plurality of first, second and third cantilevered teeth defined on said band circumferentially spaced thereabout and each having free ends, said first and second teeth free ends having a normal position radially outwardly disposed of the annular configuration of said band, whereby insertion of said ring into said body open end biases said first and second teeth free ends into said groove due to engagement with said cylindrical surface, said first teeth comprising said first elements and the free ends thereof aligning with said recess shoulder at said first ring position, said second teeth comprising said second elements and the free ends thereof aligning with said recess shoulder at said second ring position.

2. In a fitting for rigid conduit as in claim 1, said third teeth lying within the annular configuration of said band having free ends in radial alignment with said groove shoulder remote from said seal to axially retain said band within said groove during insertion of said ring into said cylindrical surface.

3. In a fitting for rigid conduit as in claim 2, said band and teeth being of a comb-like configuration having a base and teeth extending therefrom, said base being located adjacent said groove shoulder nearest said seal, said first teeth being of a shorter length than said second teeth.

4. A coupling for interconnecting threadless conduit having cylindrical walls in axially aligned end-to-end relationship comprising a tubular body having open ends, a central region and an axial cylindrical passage intersecting said ends adapted to receive the ends of conduits, a sealing assembly associated with each body end adapted to seal a conduit to said body at each end, each sealing assembly including a split radially contractable collar having radially inwardly projecting serrations inclined toward said body central region, a cam surface defined upon said collar, an annular piston having a cam surface engaging said collar cam surface, an annular elastomeric seal engaging said piston, a compression ring engaging said seal, means for forcing said ring toward said seal, compression of said seal by said ring imposing an axial force on said piston and collar radially contracting said collar upon a conduit therein, an annular groove defined in said body central region intersecting said passage, and an annular wave spring received within said groove and axially projecting into said passage comprising an abutment limiting insertion of a conduit into said body passage, said groove having an axial dimension at least as great as the normal axial dimension of said spring whereby said spring may axially compress to permit limited axial displacement of a conduit within said passage.

* * * * *